(12) United States Patent
Broders et al.

(10) Patent No.: US 11,791,643 B2
(45) Date of Patent: Oct. 17, 2023

(54) EARPIECE CHARGING CASE DETECTION

(71) Applicant: Bose Corporation, Framingham, MA (US)

(72) Inventors: Adam C. Broders, Worcester, MA (US); Kristoffer Patrick Groth, Sherborn, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 17/844,545

(22) Filed: Jun. 20, 2022

(65) Prior Publication Data
US 2022/0320879 A1      Oct. 6, 2022

Related U.S. Application Data

(63) Continuation of application No. 16/905,666, filed on Jun. 18, 2020, now Pat. No. 11,451,076.

(51) Int. Cl.
| | | |
|---|---|---|
| *H02J 7/00* | (2006.01) | |
| *H04R 25/00* | (2006.01) | |
| *H04R 1/10* | (2006.01) | |

(52) U.S. Cl.
CPC ........ *H02J 7/0044* (2013.01); *H02J 7/00034* (2020.01); *H04R 1/1025* (2013.01); *H04R 25/609* (2019.05)

(58) Field of Classification Search
CPC .. H02J 7/0044; H02J 7/00034; H04R 25/609; H04R 1/1025
See application file for complete search history.

(56) References Cited

U.S. PATENT DOCUMENTS

| | | | |
|---|---|---|---|
| 2020/0076234 A1* | 3/2020 | Lai | H04R 5/033 |
| 2020/0266640 A1* | 8/2020 | Valenzuela | H02J 7/0044 |

FOREIGN PATENT DOCUMENTS

| | | | | |
|---|---|---|---|---|
| DE | 102017210983 A1 * | 1/2019 | | H02J 7/0042 |
| KR | 102121185 B1 * | 6/2020 | | H04R 1/10 |

OTHER PUBLICATIONS

English machine translation of KR 10-2121185 (Lee et al., Wireless Earphone and Charging Case Set, published Jun. 2020) (Year: 2020).*

English machine translation of DE 102017210983 (Ding et al., Hearing Aid With a Battery and Method for Charging the Battery, published Jan. 2019) (Year: 2019).*

* cited by examiner

*Primary Examiner* — Mark Fischer
(74) *Attorney, Agent, or Firm* — BOSE CORPORATION

(57) ABSTRACT

A system with an earpiece that comprises a rechargeable earpiece power source and a case that is configured to interface with the earpiece in an earpiece power source charging configuration and comprises a case power source that is configured to recharge the earpiece power source. A detection circuit, located in part in the earpiece and in part in the case, includes at least one earpiece electrical contact that is configured to electrically couple to at least one case electrical contact when the earpiece is interfaced with the case in the earpiece power source charging configuration. The detection circuit is configured to detect, using the earpiece and case electrical contacts, whether the earpiece is interfaced with the case in the earpiece power source charging configuration, even if one of the earpiece power source and the case power source does not have power.

16 Claims, 5 Drawing Sheets

EARPIECE CHARGING CASE DETECTION

CROSS-REFERENCE TO RELATED APPLICATION

This application is a continuation of and claims priority to application Ser. No. 16/905,666 filed on Jun. 18, 2020.

BACKGROUND

This disclosure relates to detecting when an earpiece is in its charging case.

Wearable audio devices, including earpieces such as earbuds and hearing aids, typically have rechargeable batteries. The carrying case for the wearable audio devices can also recharge the batteries of the wearable audio devices when the wearable audio devices are placed into the case.

SUMMARY

All examples and features mentioned below can be combined in any technically possible way.

In one aspect, a system includes an earpiece that comprises a rechargeable earpiece power source, and a case that is configured to interface with the earpiece in an earpiece power source charging configuration and comprises a case power source that is configured to recharge the earpiece power source. A detection circuit, located in part in the earpiece and in part in the case, comprises at least one earpiece electrical contact that is configured to electrically couple to at least one case electrical contact when the earpiece is interfaced with the case in the earpiece power source charging configuration. The detection circuit is configured to detect, using the earpiece and case electrical contacts, whether the earpiece is interfaced with the case in the earpiece power source charging configuration, even if one of the earpiece power source and the case power source does not have power.

Some examples include one of the above and/or below features, or any combination thereof. In an example the earpiece is configured to be located in an ear of a user. In an example the earpiece comprises a hearing aid. In an example the case is configured to contain the earpiece in a substantially closed case interior volume. In an example the detection circuit comprises a first voltage divider in the case and a second voltage divider in the earpiece.

Some examples include one of the above and/or below features, or any combination thereof. In some examples the detection circuit comprises circuitry in the earpiece that is configured to detect when the earpiece is interfaced with the case in the earpiece power source charging configuration. In an example the earpiece further comprises circuitry that is configured to disable predetermined earpiece functionality after the detection circuitry in the earpiece detects when the earpiece is interfaced with the case in the earpiece power source charging configuration. In an example the circuitry in the earpiece that is configured to detect when the earpiece is interfaced with the case in the earpiece power source charging configuration comprises circuitry for detecting when a sensed voltage of the earpiece changes due to connection of the case power source to the earpiece. In an example the circuitry in the earpiece for detecting when a sensed voltage of the earpiece changes due to connection of the case power source to the earpiece comprises a voltage divider with an input that is electrically connected to the earpiece power source and with an output, wherein when the case power source is electrically connected to the voltage divider a path through the voltage divider is altered, and the voltage divider output is thereby altered.

Some examples include one of the above and/or below features, or any combination thereof. In some examples the detection circuit comprises circuitry in the case that is configured to detect when the earpiece is interfaced with the case in the earpiece power source charging configuration. In an example the circuitry in the case that is configured to detect when the earpiece is interfaced with the case in the earpiece power source charging configuration is configured to connect the case power source to the earpiece to cause a change in state of an earpiece circuit element, wherein the circuitry in the case is configured to detect the change in state of the earpiece circuit element as an indication that the earpiece is interfaced with the case in the earpiece power source charging configuration. In an example the detection circuitry further comprises a variable voltage source in the earpiece that is configured to receive power from the case power source. In an example the detection circuitry further comprises circuitry in the case and the earpiece that together accomplish a boost converter, and wherein operation of circuitry in the case is altered by the boost converter and such alteration is used as an indication that the earpiece is interfaced with the case in the earpiece power source charging configuration.

Some examples include one of the above and/or below features, or any combination thereof. In an example circuitry in the case is configured to provide power from the case power source that is used to both power the circuitry in the earpiece that is configured to detect when the earpiece is interfaced with the case in the earpiece power source charging configuration, and to recharge the earpiece power source. In an example the detection circuit comprises at least four sets of contacts comprising at least four external contacts on the earpiece that are configured to electrically connect with at least four contacts inside of the case. In an example a first set of contacts electrically connects ground potentials of the case and the earpiece, a second set of contacts electrically connects the case power source to the earpiece power source, a third set of contacts is used by the earpiece circuitry to determine when the earpiece is interfaced with the case in the earpiece power source charging configuration, and a fourth set of contacts is used by the case circuitry to determine when the earpiece is interfaced with the case in the earpiece power source charging configuration. In an example the detection circuit comprises two sets of contacts, wherein a first set of contacts electrically connects ground potentials of the case and the earpiece, and a second set of contacts is configured to be used by the case circuitry to determine that the earpiece is interfaced with the case in the earpiece power source charging configuration.

In another aspect, a system includes a hearing aid that is configured to be located in an ear of a user and comprises a rechargeable hearing aid power source, and a case that is configured to interface with the hearing aid in a hearing aid power source charging configuration wherein the hearing aid is contained in a substantially closed volume of the case. The case comprises a case power source that is configured to recharge the hearing aid power source. A detection circuit, located in part in the hearing aid and in part in the case, comprises at least four external hearing aid electrical contacts that are configured to electrically couple to at least four electrical contacts inside of the case when the case is interfaced with the hearing aid in the hearing aid power source charging configuration. The detection circuit is configured to detect, using the hearing aid and case electrical contacts, whether the hearing aid is interfaced with the case in the hearing aid power source charging configuration, even if one of the hearing aid power source and the case power source does not have power. A first set of contacts electrically connects ground potentials of the case and the hearing aid, a second set of contacts electrically connects the case power source to the hearing aid power source, a third set of contacts is used by the hearing aid circuitry to determine when the hearing aid is interfaced with the case in the hearing aid power source charging configuration, and a fourth set of contacts is used by the case circuitry to determine when the hearing aid is interfaced with the case in the hearing aid power source charging configuration. The detection circuit comprises circuitry in the hearing aid that is configured to detect when the hearing aid is interfaced with the case in the hearing aid power source charging configuration, and circuitry in the case that is configured to detect when the hearing aid is interfaced with the case in the hearing aid power source charging configuration by connecting the case power source to the hearing aid to cause a change in state of a hearing aid circuit element and detecting the change in state of the hearing aid circuit element as an indication that the hearing aid is interfaced with the case in the earpiece power source charging configuration. The hearing aid further comprises circuitry that is configured to disable predetermined hearing aid functionality after the detection circuitry in the hearing aid detects when the hearing aid is interfaced with the case in the hearing aid power source charging configuration.

In another aspect, a system includes a hearing aid that is configured to be located in an ear of a user and comprises a rechargeable hearing aid power source, and a case that is configured to interface with the hearing aid in a hearing aid power source charging configuration wherein the hearing aid is contained in a substantially closed volume of the case. The case comprises a case power source that is configured to recharge the hearing aid power source. A detection circuit, located in part in the hearing aid and in part in the case, comprises at least three external hearing aid electrical contacts that are configured to electrically couple to at least three electrical contacts inside of the case when the case is interfaced with the hearing aid in the hearing aid power source charging configuration. The detection circuit is configured to detect, using the hearing aid and case electrical contacts, whether the hearing aid is interfaced with the case in the hearing aid power source charging configuration, even if one of the hearing aid power source and the case power source does not have power. A first set of contacts electrically connects ground potentials of the case and the hearing aid, a second set of contacts electrically connects the case power source to the hearing aid power source, and a third set of contacts is used to determine when the hearing aid is interfaced with the case in the hearing aid power source charging configuration. The detection circuit comprises a first voltage divider in the case, and a second voltage divider in the hearing aid that has an input that is electrically connected to the hearing aid power source and has an output. When the case power source is electrically connected to the second voltage divider a path through the voltage divider is altered, and the voltage divider output is thereby altered. The hearing aid further comprises circuitry that is configured to disable predetermined hearing aid functionality after the detection circuitry in the hearing aid detects when the hearing aid is interfaced with the case in the hearing aid power source charging configuration.

DETAILED DESCRIPTION

Figure 1:
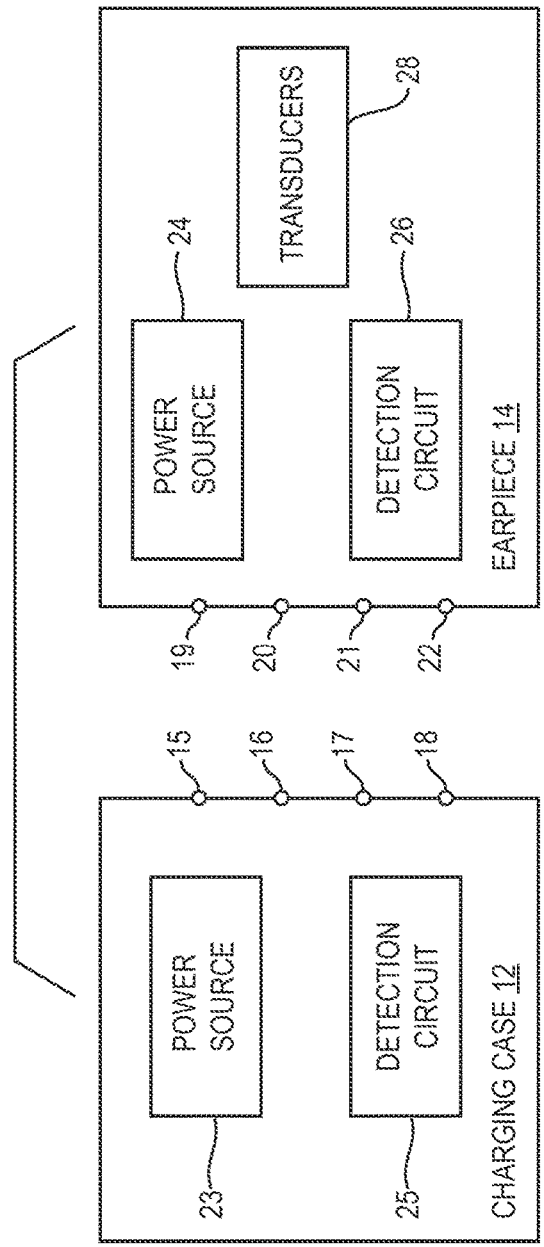
FIG. 1 is a block diagram of an earpiece and a charging case for the earpiece.

Wearable audio devices, such as earbuds, hearing aids, and other types of earpieces, usually have a rechargeable battery. A case that is configured to store the earpieces can also be configured to recharge the earpiece batteries when the earpieces are stored in the case. Knowledge of when the earpieces are properly engaged in or docked in a charging case can be used to advantage. For example, if the earpiece is on when it is docked, it can be turned off. In the case of hearing aids, if the hearing aids are not turned off when they are in the charging case they can begin to feedback and squeal, which is obviously undesirable. Knowledge of when the earpieces are properly docked in a charging case can also be used to set a user interface (UI) to indicate the docking status and/or charge state, and/or make intelligent decisions on how power is used when the earpiece is fully charged but still docked. Other actions based on proper docking are known in the technical field. In some docking status knowledge schemes, if the power source in the earbud or the power source in the case does not have power when the earpiece is docked in the case, the docking status may not be properly determined.

In the present disclosure a system and method for detecting when an earpiece is properly docked with a case includes a detection circuit that is located in part in the earpiece and in part in the case. In an example the detection circuit includes at least one earpiece electrical contact that is configured to electrically couple to at least one case electrical contact when the earpiece is interfaced with the case in the earpiece power source charging configuration. The detection circuit is configured to detect, using the earpiece and case electrical contacts, whether the earpiece is interfaced with the case in the earpiece power source charging configuration, even if one of the earpiece power source and the case power source does not have power. Several exemplary detection schemes are disclosed herein. These detection schemes are exemplary not limiting of the scope of the disclosure, as those skilled in the technical field could accomplish the detection in other ways.

This disclosure relates to a wearable audio device. Some non-limiting examples of this disclosure describe a type of wearable audio device that is known as an earpiece, which can be, for example, an earbud or a hearing aid. Earbuds and hearing aids generally include one or more electro-acoustic transducers for producing sound and/or sensing sound. Earbuds and hearing aids can be wireless or wired. In examples described herein they include a power supply (generally, a rechargeable battery), circuitry involved in recharging the power supply, and any necessary processing. Other aspects of earbuds, hearing aids, and other types of wearable audio devices that are not involved in this disclosure are not shown or described, simply for the sake of ease of illustration and clarity.

Some examples of this disclosure also describe a type of wearable audio device that is known as an open audio device. Open audio devices have one or more electro-acoustic transducers (audio drivers) that are located off of the ear canal opening. In some examples the open audio devices also include one or more microphones; the microphones can be used to pick up the user's voice, ambient sounds, and/or for noise cancellation. Open audio devices are further described in U.S. Pat. No. 10,397,681, the entire disclosure of which is incorporated herein by reference for all purposes.

A headphone refers to a device that typically fits around, on, or in an ear and that radiates acoustic energy directly or indirectly into the ear canal. Headphones are sometimes referred to as earphones, earpieces, headsets, earbuds, or sport headphones, and can be wired or wireless. A headphone includes an electro-acoustic transducer (driver) to transduce electrical audio signals to acoustic energy. The acoustic driver may or may not be housed in an earcup or in a housing that is configured to be located on the head or on the ear, or to be inserted directly into the user's ear canal. A headphone may be a single stand-alone unit or one of a pair of headphones (each including at least one acoustic driver), one for each ear. A headphone may be connected mechanically to another headphone, for example by a headband and/or by leads that conduct audio signals to an acoustic driver in the headphone. A headphone may include components for wirelessly receiving audio signals. A headphone may include other functionality, such as additional microphones for an active noise reduction system, or one or more microphones that are used to pick up the user's voice and/or ambient sounds.

An open audio device includes but is not limited to an off-ear headphone, i.e., a device that has one or more electro-acoustic transducers that are coupled to the head or ear (typically by a support structure) but do not occlude the ear canal opening. In some examples an open audio device is an off-ear headphone comprising audio eyeglasses, but that is not a limitation of the disclosure as in an open audio device the device is configured to deliver sound to one or both ears of the wearer where there are typically no ear cups and no ear buds. The wearable audio systems contemplated herein may include a variety of devices that include an over-the-ear hook, such as a wireless headset, hearing aid, eyeglasses, a protective hard hat, and other open ear audio devices.

One or more of the devices, systems, and methods described herein, in various examples and combinations, may be used in a wide variety of wearable audio devices or systems, including wearable audio devices in various form factors.

It should be noted that although specific implementations of wearable audio devices primarily serving the purpose of acoustically outputting audio are presented with some degree of detail, such presentations of specific implementations are intended to facilitate understanding through provisions of examples and should not be taken as limiting either the scope of the disclosure or the scope of the claim coverage.

FIG. 1 is a block diagram of a detection system 10 that includes an earpiece 14 and a charging case 12 for the earpiece. System 10 can also be used to accomplish methods described herein. System 10 is configured to detect when earpiece 14 is properly docked with a case 12. System 10 includes a detection circuit with detection circuit part or portion 26 located in earpiece 14 and detection circuit part or portion 25 located in case 12. Both earpiece 14 and case 12 include electrical contacts that are configured, located, and arranged to be electrically coupled together when the earpiece is properly engaged with (docked with) the case. Each of the earpiece and case can have one or more such contacts. In this non-limiting example each has four mating contacts—contacts 15-18 on or in case 12, and contacts 19-22 that are exposed to the surface of earpiece 14 such that they make electrical contact with contacts 15-18, respectively, when the earpiece is properly engage with or interfaced with the case in an earpiece power source charging configuration. In this example the detection circuit includes at least one earpiece electrical contact that is configured to electrically couple to at least one case electrical contact when the case is interfaced with the earpiece in the earpiece power source charging configuration. The detection circuit comprising portions 25 and 26 is configured to detect, using the earpiece and case electrical contacts, whether the earpiece is interfaced with the case in the earpiece power source charging configuration, even if one of the earpiece power source 24 and the case power source 23 does not have power. Earpiece 14 also includes one or more transducers 28, such as microphone(s) and/or acoustic drivers. One or both types of transducers are commonly used in earpieces. For example, a driver can be used to create sound that is outputted into the ear or into the environment close to the ear. A microphone can be used to detect the user's voice and/or environmental sounds. When the earpiece is an earbud or a type of open audio device, microphones are often used to detect the user's voice (e.g., for phone calls or voice commands) and/or to detect sound from the acoustic driver and/or environmental sounds for use in active noise reduction. When the earpiece is a hearing aid, microphone(s) can be used to detect environmental sound that is reproduced by the audio driver and provided into or close to the user's ear. It should be understood that aspects of earpieces and charging cases for earpieces are not included in FIG. 1 simply for the sake of clarity.

Figure 2:
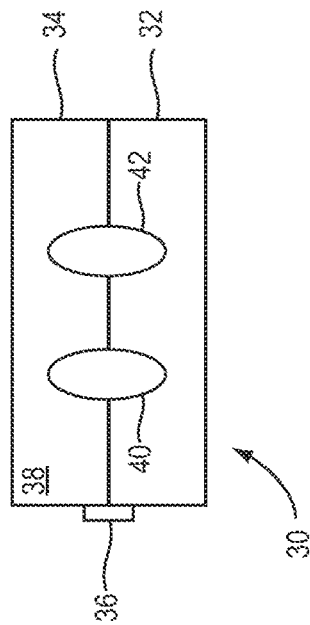
FIG. 2 is a schematic diagram of two earpieces located inside of a case in the earpiece power source charging configuration.

FIG. 2 is a schematic diagram of two earpieces 40 and 42 inside of charging case 30. Earpieces 40 and 42 are in the earpiece power source charging configuration. Case 30 comprises bottom portion 32 and top portion 34 connected by hinge 36 so that top 34 can be opened and closed. Some of the case interior 38 is open. The case interior 38 thus acts as a sound chamber. If one or both earpieces are turned on and detecting and producing sound when they are in the case, the sound can feedback, leading to undesirable squealing. It is thus best for the earpieces to be automatically turned off when they are placed in the case. Detection of the earpiece(s) being properly located in the charging configuration can also be used to control other aspects of the case and/or earpieces. For example, as described above knowledge of when the earpieces are properly docked in a charging case can be used to advantage. For example, if the earpiece is on when it is docked, it can be turned off. Also, a UI (not shown) can be set to indicate the docking status and/or charge state, and/or make intelligent decisions on how power is used when the earpiece is fully charged but still docked. Other actions based on proper docking are known in the technical field.

Figure 3A:
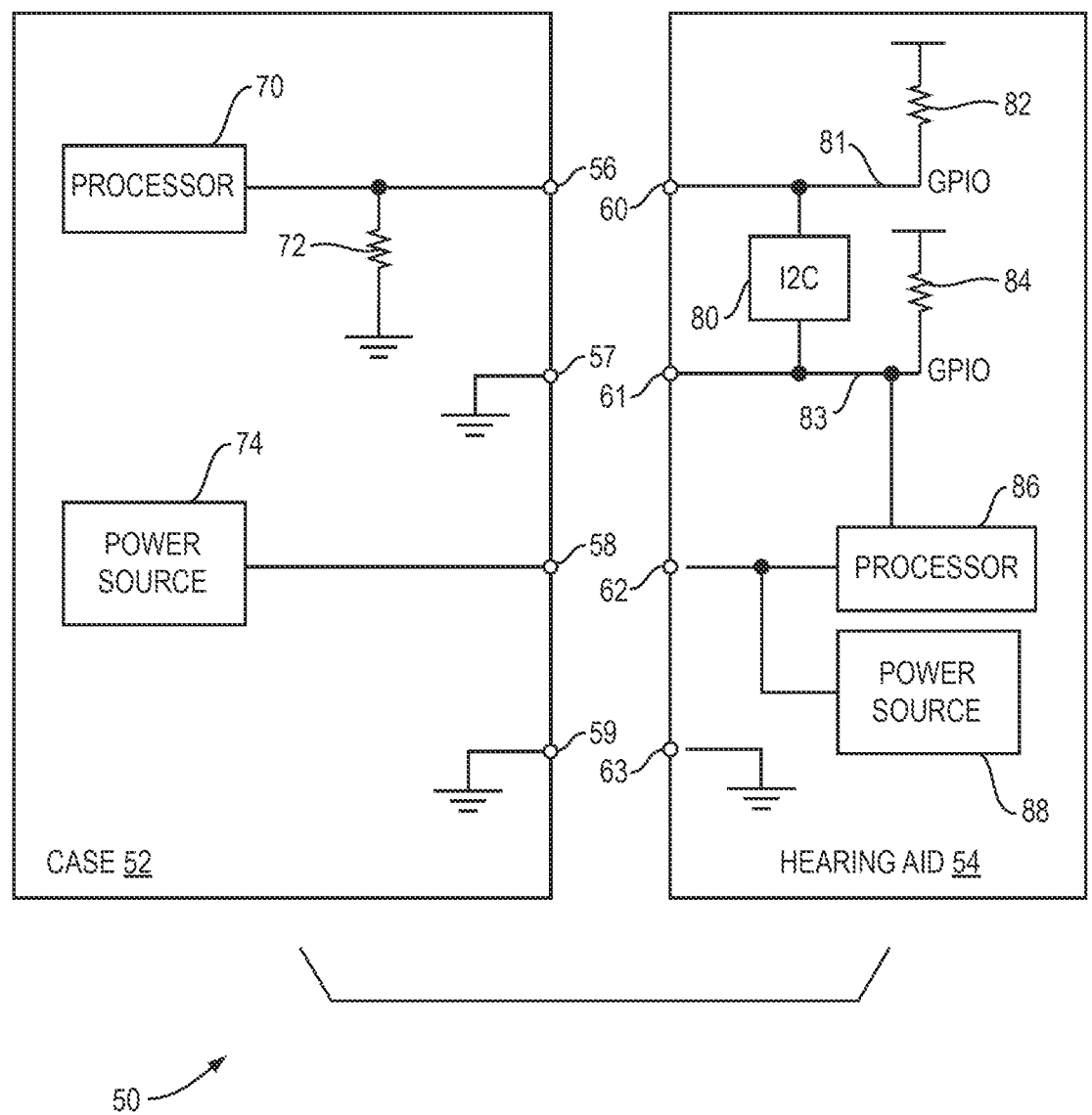
FIG. 3A is a block diagram of a hearing aid and a charging case for the hearing aid, illustrating a detection circuit that is configured to detect whether the hearing aid is interfaced with the case in the hearing aid charging configuration, even if one of the hearing aid power source and the case power source does not have power.

FIG. 3A is a block diagram of a system 50 that includes a hearing aid 54 and a charging case 52 for the hearing aid, illustrating a detection circuit that is configured to detect whether the hearing aid/earpiece is interfaced with the case in the charging configuration, even if one of the hearing aid/earpiece power source and the case power source does not have power. Hearing aid 54 has external contacts 60-63 that are configured to electrically connect to case electrical contacts 56-59, respectively, when the earpiece is properly docked in the case. Once docked, case power source 74 (which can be a battery or a power source that is supplied with AC or mains power, e.g., from a wall outlet) supplies power to recharge earpiece battery power source 88 via contacts 58 and 62. Aspects of the detection circuit that are configured to detect whether hearing aid 54 is properly docked with case 52 are illustrated in FIG. 3A. Such detection can occur even if one of case power source 74 and hearing aid power source 88 does not have power. A likely but non-limiting scenario is when the hearing aid battery dies and it is put into the case to charge. Also, the case may not be plugged into a power supply for the case power source (which is often +5V DC).

In many existing earpiece charging cases, if the earpiece battery is depleted when the earpiece is placed into the case the battery will have to partially recharge before the earpiece and case can communicate that the earpiece is docked. This can lead to undesired actions such as those described above. Also, if the case is not powered (e.g. it is either unplugged or the battery is drained) but the hearing aid still has power and is on, since the hearing aid cannot detect the case the hearing aid may not be shut off automatically, and when the case is shut the hearing aid can produce undesired and annoying squealing sounds. Another consequence is that the hearing aid will drain its battery when it could have otherwise been preserving the battery for later use.

The detection circuit includes two general purpose input/output (GPIO) pins 81 and 83 with pullup resistors 82 and 84, and I2C functionality 80, all of which can be enabled by appropriate digital and analog hardware and any necessary control and communications functionality (e.g., firmware), which can be parts of a system on an I2C chip. In an example I2C processor 80, resistors 82 and 84, and processor 86 are all functional aspects of one hearing aid processor. Pin 81 is connected to contact 60 and pin 83 is connected to contact 61. Ground is provided via mating contacts 59 and 63. Contact 60 is used by case 52 to sense the connection of hearing aid 54 via processor 70 and resistor 72; when power source 74 is coupled to the hearing aid via contacts 58 and 62, processor 86 and I2C 80 enable pullup of pin 81. The resulting change in voltage at pin 56 is sensed by processor 70 as an indication that case power is being provided to hearing aid 54 (i.e., hearing aid 54 is in the proper docking position). Processor 70 can cause desired actions of case 52, such as turning on "charging" indicator LEDs (not shown). Also, connection causes pin 83 to be pulled up. The resulting change in voltage at pin 83 (due to the power from hearing aid power source 88 and a ground connection via case contact 58) allows processor 86 of hearing aid 54 to determine that the hearing aid is docked and take desire actions of the hearing aid, such as shutting off its transducers (not shown in this drawing) to prevent squealing. A corollary aspect of this system design is that the hearing aid I2C chip can disable the GPIO pullups in order to allow for better communication between the hearing aid and case. Logic in the processor can determine if a state change on the I2C pins is an I2C message or a static state. It can then disable the GPIO pullups until its logic determines that the I2C transaction is likely over.

Figure 3B:
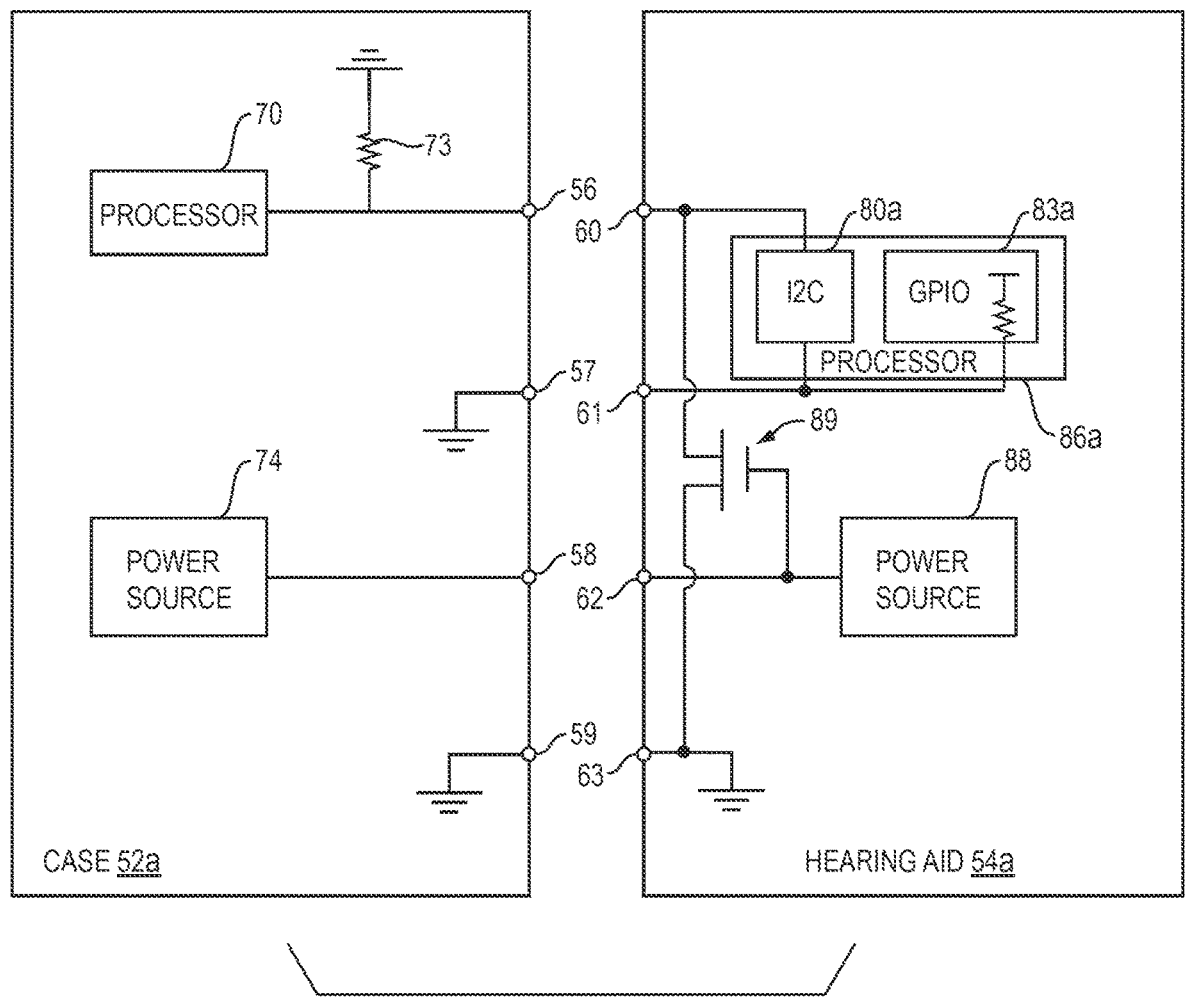
FIG. 3B is a variant of the hearing aid and charging case of FIG. 3A.

A variant of system 50 is illustrated as system 50a, FIG. 3B. Hearing aid 54a includes processor 86a that functionally includes I2C 80a and GPIO 83a. Hearing aid 54a detects case 52a in the same manner as described above relative to FIG. 3A. Case 52a senses hearing aid 54a by detecting the voltage on pin 56 using processor 70. When the hearing aid is disconnected, this voltage is normally high. Plugging in the hearing aid will pull this line low, but only if contacts 56, 58, and 59 are all properly connected to the corresponding hearing aid contacts. The application of the case power source 74 on contact 62 turns on the N-channel MOSFET 89, which connects the signal at contact 60 to ground. For the scenario where the charging case does not have power, it does not turn on transistor 89, which does not matter since the case does not have power to sense the signal at contact 56. Resistor 73 is connected to the case rail voltage. Accordingly, if processor 70 detects a high voltage, either the hearing aid is not connected, or one of contacts 56, 58, and 59 is not making proper connection. If processor 70 detects a low voltage, then contacts 56, 58, and 59 are all connected properly to the corresponding contacts of the hearing aid.

Figure 4:
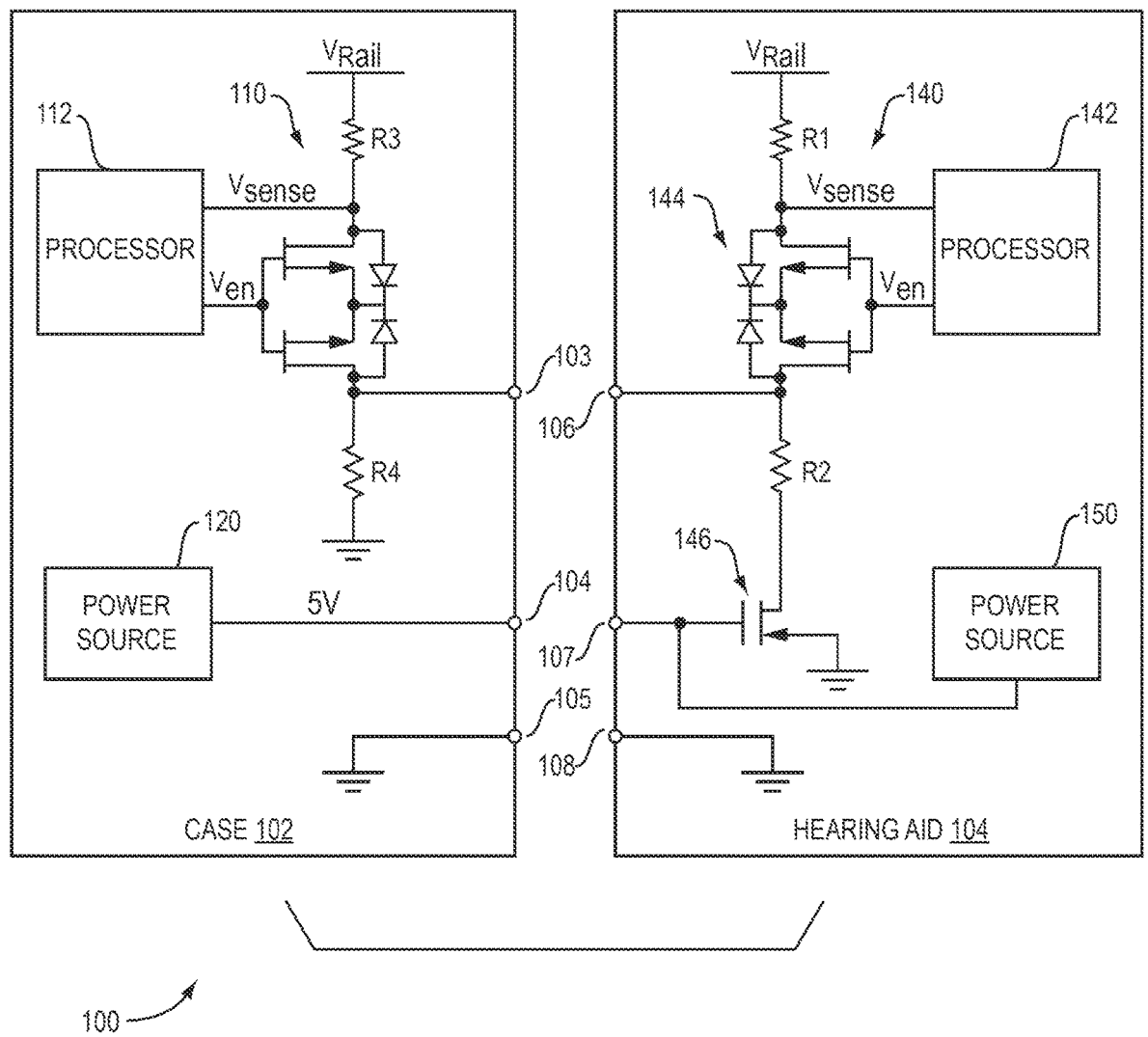
FIG. 4 is a block diagram of a hearing aid and a charging case for the hearing aid, illustrating another detection circuit that is configured to detect whether the hearing aid is interfaced with the case in the hearing aid charging configuration, even if one of the hearing aid power source and the case power source does not have power.

FIG. 4 is a block diagram of a system 100 that includes a hearing aid and a charging case for the hearing aid, illustrating another detection circuit that is configured to detect whether the hearing aid is interfaced with the case in the hearing aid charging configuration, even if one of the hearing aid power source and the case power source does not have power. System 100 employs three mating contacts on each of case 102 and hearing aid 104, contacts 103-105 and 106-108, respectively. Contact set 105 and 108 establishes a ground connection. Contact set 104 and 107 establishes a power connection that can both recharge hearing aid power source 150 and provide power to the hearing aid detection circuit if hearing aid power source 150 is depleted. Contact set 103 and 106 establishes a sense connection. Case 102 includes voltage comparator 110 and hearing aid 104 includes voltage comparator 140. Each comparator includes an input voltage (Vrail, provided by the local power source). The comparators also include resistors R1-R4 and back-to-back P-FETS 114 and 144.

The sense pin is shared and allows either part to detect the other, regardless of whether the other has power. In a comparator method, the resistor values are chosen so that the voltages fall regardless of whether the hearing aid has power. Depending on the resistor values, the circuitry can be established such that Vsense on the case side rises above a high threshold when a powered hearing aid is connected and falls below a lower threshold when an unpowered hearing aid is connected. The voltage swing is at least in part dependent on the resistor values.

With N-channel MOSFET 146 that is connected to case power source 120, the detection works only if the sense pins, power pins, and ground pins are all connected. If MOSFET 146 is not present the system is configured to detect presence on the sense pin before turning on the power to the hearing aid, whereas including it requires the power to be turned on in order to detect.

The enable voltages (Ven, both for the case and the hearing aid) come from the respective system processors/controllers 112 and 142. The enable voltage on each side needs to be low enough to turn on the P-channel MOSFETs of sets 114 and 144. They could even be tied low statically since the PFETs would turn off if the Vrail was not present.

Disabling the PFETs could save a little power, especially if other information in the system can be used to establish that the detection is not needed. Non-limiting examples of other information that can be used to establish that detection is not needed include the following. The charging case has a lid that can be opened and closed. The case processor can sense whether the lid is open or closed. If the processor determines that the lid is closed and the hearing aids are not inserted, then it can assume that it is not possible for the hearing aids to be inserted until the lid is opened. Until the lid is opened, the hearing aid detection portion can be disabled. On the hearing aid side, if the hearing aid has detected via its processor that it is connected to a case and it can also sense that the case is supplying power, it can disable the detection circuit until the case power supply is removed. At this point it can reenable the detection circuit to double check whether it is still inserted in the case. Doing this does not impact the charging case's ability to sense that the hearing is attached. The hearing aid detection circuit can be pulsed on and off while the hearing aid is in normal operation. As long as the period at which the sensing is pulsed is frequent enough, the hearing aid would detect the case and mute its output before a user would notice any of the described undesirable behaviors. However, the default value would be for the enable signals to be low so that the gate-to-source voltage is big enough to enable the detection circuit.

Connection and power options relating to system 100 are as follows. If both case 102 and hearing aid 104 are powered and are successfully connected on all pins, each senses the other and performs their respective post-sensing tasks via processors 112 and 142 (e.g., the case updates its UI, the hearing aid mutes its output). If the case is powered and the hearing aid is unpowered, and they are successfully connected on all three pins, the case can sense that the hearing aid is present and updates its UI (e.g., an LED display), and the hearing aid begins charging. If the case is unpowered and the hearing aid is powered and they are successfully connected on all pins the case cannot charge the hearing aid but the hearing aid will sense the case presence and modify its own configuration as needed. If both the case and the hearing aid are powered but the power pins are not connected and the other two sets of pins are connected the hearing aid could sense that it is connected, but the case would not sense any connection.

Figure 5:
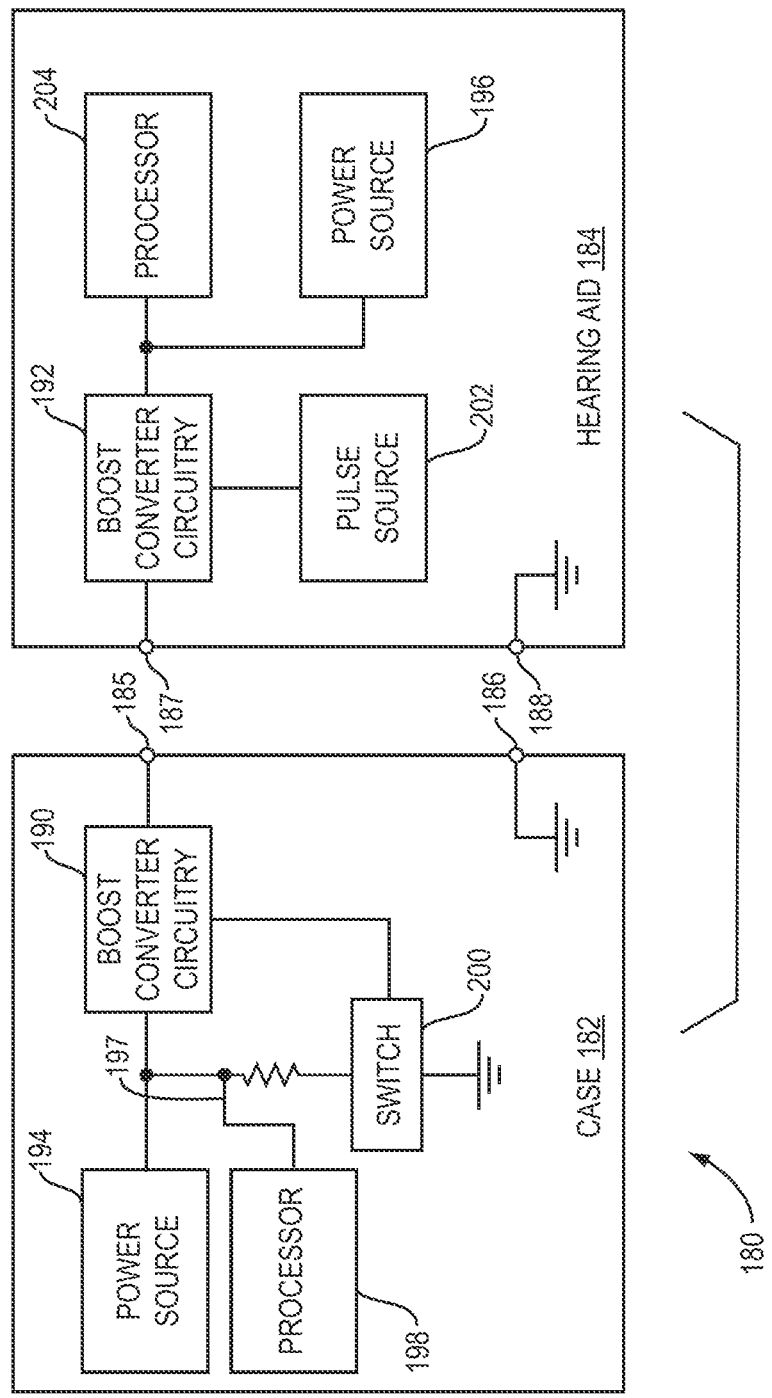
FIG. 5 is a block diagram of a hearing aid and a charging case for the hearing aid, illustrating another detection circuit that is configured to detect whether the hearing aid is interfaced with the case in the hearing aid charging configuration, even if one of the hearing aid power source and the case power source does not have power.

The case will sense the hearing aid as follows. The voltage on the Vsense (case) node will swing when a hearing aid is plugged in. This change in voltage could be sensed in several different ways. One is by the use of a comparator (which compares it against some predefined reference voltage). Two comparators can be used as depicted in FIG. 4, to catch both the rising and falling scenarios. Another is by reading the voltage with an analog to digital converter and deciding in firmware if the threshold has been crossed. This method could be used in one or both of the hearing aid and the case. Another is that the Vsense (case) voltage could also be used to control a transistor (not shown). The transistor could be used as a switch, and the Vsense (case) voltage could be conditioned so that it would cross the turn-on threshold for the transistor when the hearing aid is connected/disconnected FIG. 5 is a block diagram of a system 180 that includes a hearing aid 184 and a charging case 182 for the hearing aid, illustrating another detection circuit that is configured such that the case can detect whether the hearing aid is interfaced with the case in the hearing aid charging configuration, even if one of the hearing aid power source and the case power source does not have power. Another sensor (not shown, such as a Hall effect sensor in the hearing aid and a mating magnet in the case) could be used for the hearing aid to sense the case. System 180 requires only two sets of mating contacts. Set 186 and 188 establish ground connections, and contacts 185 and 187 are the power/sense contacts that when connected connect case power source 194 to recharge hearing aid power source 196, and also provide power to operate the detection circuitry of the hearing aid. Detection works using a pulse voltage source 202 and boost converter circuitry split between the hearing aid and case, 192 and 190, respectively. The boost converter will eventually turn on digital switch 200 thus changing the voltage at location 197, indicating to case processor 198 that the hearing aid is connected. Hearing aid processor 204 can be used to both control pulse source 202 and, using a separate sensor, determine that the hearing aid is connected to the case and take appropriate actions as described elsewhere herein.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Examples of the systems, devices, and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other examples are within the scope of the following claims.

What is claimed is:

1. A system, comprising:
an earpiece that comprises three separate earpiece external electrical contacts and a rechargeable earpiece power source;
a case that is configured to interface with the earpiece in an earpiece power source charging configuration and comprises three separate case external electrical contacts and a case power source that is configured to recharge the earpiece power source;
wherein each of the three separate earpiece external electrical contacts is configured to electrically couple to a respective one of the three separate case electrical contacts when the earpiece is interfaced with the case in the earpiece power source charging configuration;
wherein a first pair of coupled earpiece and case electrical contacts are configured to pass power from the case power source to the earpiece power source;
wherein the electrical interconnection of a second pair of coupled earpiece and case electrical contacts is used by the case to sense connection of the earpiece to the case and the electrical interconnection of a third pair of coupled earpiece and case electrical contacts is used by the earpiece to sense connection of the earpiece to the case; and
wherein circuitry in the case is configured to provide power from the case power source that is used to both power circuitry in the earpiece that is configured to detect when the earpiece is interfaced with the case in the earpiece power source charging configuration, and to recharge the earpiece power source.

2. The system of claim 1 wherein the earpiece is configured to be located in an ear of a user.

3. The system of claim 1 wherein the earpiece comprises a hearing aid.

4. The system of claim 1 wherein the case is configured to contain the earpiece in a substantially closed case interior volume.

5. The system of claim 1 wherein the earpiece further comprises circuitry that is configured to disable predetermined earpiece functionality after the earpiece senses connection of the earpiece to the case.

6. The system of claim 1 wherein the earpiece further comprises circuitry for detecting when a sensed voltage of the earpiece changes due to connection of the case power source to the earpiece.

7. The system of claim 6 wherein the circuitry in the earpiece for detecting when a sensed voltage of the earpiece changes due to connection of the case power source to the earpiece comprises a voltage divider with an input that is electrically connected to the earpiece power source and with an output, wherein when the case power source is electrically connected to the voltage divider a path through the voltage divider is altered, and the voltage divider output is thereby altered.

8. The system of claim 1 wherein the case further comprises a first voltage divider and the earpiece further comprises a second voltage divider, and wherein the first and second voltage dividers are used to sense connection of the earpiece to the case.

9. The system of claim 1 wherein the case further comprises circuitry that is configured to connect the case power source to the earpiece to cause a change in state of an earpiece circuit element, wherein the circuitry in the case is configured to detect the change in state of the earpiece circuit element as an indication that the earpiece is interfaced with the case in the earpiece power source charging configuration.

10. The system of claim 9 wherein the earpiece further comprises a variable voltage source that is configured to receive power from the case power source.

11. The system of claim 1 further comprising circuitry in the case and the earpiece that together accomplish a boost converter, and wherein operation of circuitry in the case is altered by the boost converter and such alteration is used as an indication that the earpiece is interfaced with the case in the earpiece power source charging configuration.

12. The system of claim 1 wherein the earpiece and the case each further comprises a fourth external electrical contact that are configured to electrically couple when the earpiece is interfaced with the case in the earpiece power source charging configuration.

13. The system of claim 12 wherein the fourth set of contacts electrically connects ground potentials of the case and the earpiece.

14. A system, comprising:
a hearing aid that is configured to be located in an ear of a user and comprises four separate hearing aid external electrical contacts and a rechargeable hearing aid power source;
a case that is configured to interface with the hearing aid in a hearing aid power source charging configuration wherein the hearing aid is contained in a substantially closed volume of the case, wherein the case comprises four separate case external electrical contacts and a case power source that is configured to recharge the hearing aid power source;
wherein each of the four separate hearing aid external electrical contacts is configured to electrically couple to a respective one of the four separate case electrical contacts when the hearing aid is interfaced with the case in the hearing aid power source charging configuration;
wherein a first pair of coupled hearing aid and case electrical contacts are configured to pass power from the case power source to the hearing aid power source;
wherein a second pair of coupled hearing aid and case electrical contacts are configured to electrically connect ground potentials of the case and the hearing aid;
wherein the electrical interconnection of a third pair of coupled hearing aid and case electrical contacts is used by the case to sense connection of the hearing aid to the case and the electrical interconnection of a fourth pair of coupled hearing aid and case electrical contacts is used by the hearing aid to sense connection of the hearing aid to the case;
wherein the hearing aid further comprises circuitry that is configured to disable predetermined hearing aid functionality after the hearing aid senses connection of the hearing aid to the case; and
wherein circuitry in the case is configured to provide power from the case power source that is used to both power circuitry in the earpiece that is configured to detect when the earpiece is interfaced with the case in the earpiece power source charging configuration, and to recharge the earpiece power source.

15. A system, comprising:
an earpiece that comprises three separate earpiece external electrical contacts and a rechargeable earpiece power source;
a case that is configured to interface with the earpiece in an earpiece power source charging configuration and comprises three separate case external electrical contacts and a case power source that is configured to recharge the earpiece power source;

wherein each of the three separate earpiece external electrical contacts is configured to electrically couple to a respective one of the three separate case electrical contacts when the earpiece is interfaced with the case in the earpiece power source charging configuration;

wherein a first pair of coupled earpiece and case electrical contacts are configured to pass power from the case power source to the earpiece power source;

wherein the electrical interconnection of a second pair of coupled earpiece and case electrical contacts is used by the case to sense connection of the earpiece to the case and the electrical interconnection of a third pair of coupled earpiece and case electrical contacts is used by the earpiece to sense connection of the earpiece to the case; and wherein the case further comprises a first voltage divider and the earpiece further comprises a second voltage divider, and wherein the first and second voltage dividers are used to sense connection of the earpiece to the case.

16. A system, comprising:

an earpiece that comprises three separate earpiece external electrical contacts and a rechargeable earpiece power source;

a case that is configured to interface with the earpiece in an earpiece power source charging configuration and comprises three separate case external electrical contacts and a case power source that is configured to recharge the earpiece power source;

wherein each of the three separate earpiece external electrical contacts is configured to electrically couple to a respective one of the three separate case electrical contacts when the earpiece is interfaced with the case in the earpiece power source charging configuration;

wherein a first pair of coupled earpiece and case electrical contacts are configured to pass power from the case power source to the earpiece power source;

wherein the electrical interconnection of a second pair of coupled earpiece and case electrical contacts is used by the case to sense connection of the earpiece to the case and the electrical interconnection of a third pair of coupled earpiece and case electrical contacts is used by the earpiece to sense connection of the earpiece to the case; and circuitry in the case and the earpiece that together accomplish a boost converter, and wherein operation of circuitry in the case is altered by the boost converter and such alteration is used as an indication that the earpiece is interfaced with the case in the earpiece power source charging configuration.

* * * * *